United States Patent [19]

Katritzksy et al.

[11] Patent Number: 4,816,554
[45] Date of Patent: Mar. 28, 1989

[54] POLY(AMIDO METHYL-BENZAZOLE)

[75] Inventors: Alan R. Katritzksy; Joel Swinson, both of Gainesville, Fla.; Kumars Sakizadeh, Woodbury, Minn.; Jerald K. Rasmussen, Stillwater, Minn.; Larry R. Krepski, White Bear Lake, Minn.; Steven M. Heilmann, Afton, Minn.

[73] Assignee: Minnesota Mining and Manufacturing Company, St. Paul, Minn.

[21] Appl. No.: 54,609

[22] Filed: May 27, 1987

[51] Int. Cl.$^4$ ............................................. C08G 69/00
[52] U.S. Cl. ................................... 528/210; 528/310; 528/321; 528/331; 528/423
[58] Field of Search ............... 528/331, 423, 310, 210, 528/321

[56] References Cited

PUBLICATIONS

English language translation of French patent document No. 887,530.
P. E. Cassidy, "Thermally Stable Polymers", Marcel Dekker, Inc., New York, NY, 1980, Chapter 6, pp. 141–221.
C. S. Cleaver and B. C. Pratt, J. Am. Chem. Soc., 1955, 77, 1541–1543.
Ueda et al., J. Polym. Sci. Polym. Chem., 1978, 16, 155–162.
Ueda et al., J. Polym. Sci., Polym. Chem., 1975, 13, 659–677.
Habib et al., J. Prakt. Chem., 1983, 325, 685–688.
Harb et al., Heterocycles, 1986, 24, 1873–1881.

Primary Examiner—Harold D. Anderson
Attorney, Agent, or Firm—Donald M. Sell; Lorraine R. Sherman

[57] ABSTRACT

A class of polymers comprises one or more 2-amidomethylbenzazole units,

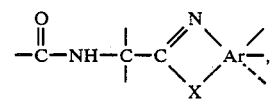

contained within the main polymer backbone, wherein Ar is $Ar^1$ or $Ar^2$, wherein $Ar^1$ is a tetravalent aromatic nucleus having two pairs of valences, the members of each pair being situated on adjacent carbon atoms; $Ar^2$ is a trivalent aromatic nucleus in which at least two of the valences are situated on adjacent carbon atoms; and X is $-NR^4-$, $-O-$, or $-S-$, where $R^4$ is hydrogen or alkyl of 1 to 8 carbon atoms or an aryl group.

19 Claims, No Drawings

POLY(AMIDO METHYL-BENZAZOLE)

FIELD OF THE INVENTION

This invention relates to polymers comprising 2-amidomethylbenzazole units. In another aspect, it relates to a process for preparing heterocycle-containing polymers.

BACKGROUND ART

Polymers containing benzazole units (i.e., benzimidazole, benzoxazole, or benzothiazole) in the polymer backbone are well-known in the art. The outstanding thermal and chemical stabilities of this class of polymers have suggested broad utility in high-temperature films, laminates, adhesives, fibers, and insulating foams. In general, these polymers are prepared by the reaction of ortho-substituted aromatic amines with dicarboxylic acids or their derivatives at high temperatures. These polymers have been reviewed by P. E. Cassidy, "Thermally Stable Polymers", Marcel Dekker, Inc., New York, N.Y., 1980, Chapter 6, pp. 141-221.

French Pat. No. 887,530 (1943) describes the preparation of high molecular weight polyamides and polyesteramides by reaction of bisazlactones with aliphatic diamines, diols, or aminoalcohols. Polyamides from bisazlactones and diamines have also been described by C. S. Cleaver and B. C. Pratt, *J. Am. Chem. Soc.*, 1955, 77, 1541-1543, and by Ueda, et al. *J. Polym. Sci., Polym. Chem.*, 1978, 16, 155-162. Ueda, et al., *J. Polym. Sci., Polym. Chem.*, 1975, 13, 659-677, disclose the preparation of polyamides from 4,4-arylidenebisazlactones. Although some of these references disclose polyamides prepared from aromatic diamines, none teach the reaction of bisazlactones with bis(ortho-substituted aromatic amines).

The reaction of 4-arylideneazlactones with ortho-substituted anilines was described during the course of our investigations. Habib, et al., *J. Prakt. Chem.*, 1983, 325, 685-688, report the isolation of a variety of compounds including benzimidazoles, depending upon reaction conditions, from the reaction of these 4-unsaturated azlactones with o-phenylenediamine. More recently, Harb, et al., *Heterocycles*, 1986, 24, 1873-1881, report the preparation of benzimidazoles or benzothiazoles by reaction with o-phenylenediamine or 2-mercaptoaniline respectively.

To applicant's knowledge, no polymers have been prepared previously incorporating the 2-amidomethylbenzazole unit.

SUMMARY OF THE INVENTION

Briefly, the present invention provides a class of polymers comprising one or more 2-amidomethylbenzazole units,

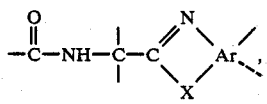

contained within the main polymer backbone, wherein Ar is a tetravalent or trivalent aromatic nucleus Ar$^1$ or Ar$^2$, respectively, wherein Ar$^1$ is a tetravalent aromatic nucleus having two pairs of valences, the members of each pair being situated on adjacent carbon atoms, and preferably the two pairs of valences are symmetrically oriented on the nucleus, and Ar$^2$ is a trivalent aromatic nucleus in which at least two of the valences are situated on adjacent carbon atoms, and X is —NR$^4$—, —O—, or —S—, where R$^4$ is hydrogen or alkyl of 1 to 8 carbon atoms or an aryl group.

The novel heterocycle-containing polymers of the invention can be prepared by a ring-opening reaction of a bisazlactone with an aromatic amine monomer having at least one additional nucleophilic group ortho to the amine substituent, followed by cyclodehydration.

In this application:

"trivalent or tetravalent aromatic nucleus" means the trivalent or tetravalent residues remaining after removal of three or four hydrogen atoms, respectively, from an aromatic or heteroaromatic compound which can consist of one ring or two fused or catenated rings having 5 to 12 ring atoms which can include up to 3 heteroatoms selected from S, N, and nonperoxidic O;

"azlactone" means a 2-oxazolin-5-one group:

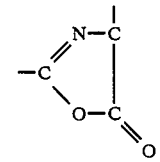

"polymer" means a compound having repeating units of one or more types, including "oligomers" (compounds having 2 to 5 repeating units);

"nucleophilic group" means an —XH group, wherein X is —NR$^4$— (where R$^4$ is as defined above), —S—, or —O— which can be attached to an organic group R$^d$; R$^d$—XH is capable of causing an azlactone to undergo a nucleophilic ring-opening reaction as follows:

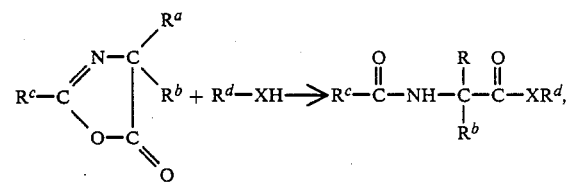

"non-nucleophilic group" means a group not readily capable of causing a nucleophilic ring-opening reaction with an azlactone, i.e., groups other than amines, alcohols, and thiols;

"alkyl" and "alkylene" mean the monovalent or divalent residues remaining after removal of one or two hydrogen atoms respectively from a linear, branched or cyclic saturated hydrocarbon having 1 to 16 carbon atoms;

"alkenylene" means the divalent residue remaining after the removal of two hydrogen atoms from an alkene having 2 to 16 carbon atoms;

"aryl" and "arylene" mean the monovalent or divalent residues remaining after removal of one or two hydrogen atoms respectively from an aromatic or heteroaromatic compound which can consist of one ring or two fused or catenated rings having 5 to 12 ring atoms which can include up to 3 heteroatoms selected from S, N, and nonperoxidic O. The carbon atoms can be substituted by up to three halogen atoms, $C_1$-$C_4$ alkyl, $C_1$-$C_4$ alkoxy, N,N-di($C_1$-$C_4$ alkyl)amino, nitro, cyano, and $C_1$-$C_4$ alkyl carboxylic ester; "arenyl" and "arenylene" mean the monovalent or divalent residues remaining after removal of one or two hydrogen atoms respectively from the alkyl portion of a hydrocarbon containing both alkyl and aryl groups having 6 to 26 carbon and heteroatoms; and "backbone" means the main chain of a polymer.

DETAILED DESCRIPTION OF THE INVENTION

The present invention provides novel amide/benzazole-containing polymers which are the reaction products of one or more bis(azlactones) of general Formula I

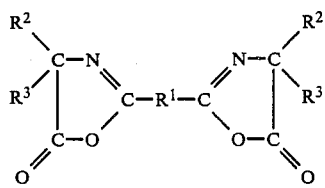

wherein
R¹ represents a single bond or R¹ represents a hydrocarbon group selected from alkylene groups of 1 to 16 carbon atoms, alkenylene group of 2 to 16 carbon atoms, arylene groups of 5 to 12 ring atoms, and arenylene groups of 6 to 26 carbon and heteroatoms, or R¹ represents a series of 2 to 8 alkylene, arylene, and arenylene groups joined by up to 7 catenary heteroatoms selected from nonperoxidic —O—, —S—, and —NR⁴— in which R⁴ is defined as above; and R² and R³ independently represent a hydrogen atom, an alkyl group of 1 to 16 carbon atoms, an aryl group of 5 to 12 ring atoms, or an arenyl group of 6 to 26 carbon and heteroatoms, or R² and R³ taken together with the carbon atom to which they are joined form a carbocyclic ring of 4 to 12 ring atoms;

with one or more aromatic amines selected from the group consisting of:
(a) tetravalent aromatic diamines of general Formula II

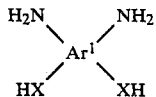

wherein
Ar¹ represents a tetravalent aromatic nucleus having two pairs of NH₂ and XH substituents, said substituents in each pair being in an ortho position relative to each other; and
each X can be the same or different group and each is independently selected from —NR⁴—, —O—, or —S—, wherein R⁴ is hydrogen or an alkyl group of 1 to 8 carbon atoms or an aryl group; and
(b) trivalent aromatic amines of general Formula III

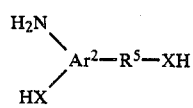

wherein
Ar² represents a trivalent aromatic nucleus in which the NH₂ and XH groups directly attached to the aromatic nucleus are in an ortho position relative to each other;
R⁵ represents a single bond or an alkylene or alkenylene group of 1 to 4 carbon atoms; and
X is as described above, and
(c) trivalent aromatic aminoacids of general Formula IV

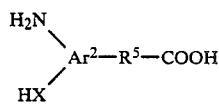

wherein Ar², X, and R⁵ are as described above.

The novel polymers of the invention comprise one or more 2-amidomethylbenzazole units of the Formula V in the backbone

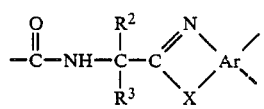

wherein Ar is a tetravalent or trivalent aromatic nucleus identical with Ar¹ or Ar², and optionally comprising units selected from those of Formulae VI and VII

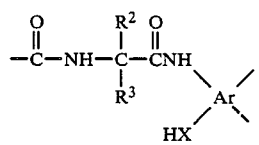

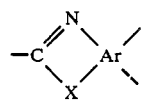

in the polymer backbone.

Bisazlactones of Formula I are well known in the art, and are readily prepared by reaction of a corresponding diacid chloride with an appropriate amino acid followed by cyclodehydration using, for example, acetic anhydride or ethyl chloroformate/triethylamine. Representative bisazlactones and procedures for their preparation may be found in the following articles, herein incorporated by reference: (a) C. S. Cleaver and B. C. Pratt, *J. Am. Chem. Soc.*, 1955, 77, 1544–1546; (b) L. D. Taylor, T. E. Platt, M. H. Mach, *J. Polym. Sci., Polym. Letters*, 1970, 8, 537–540; (c) R. D. Katsarava, et al., *Acta Polym.*, 1985, 36, 29–38. Additional bisazlactones useful for the purposes of this invention are described in U.S. Pat. No. 4,291,152 (Inata, et al.) and in U.S. Pat. No. 4,485,236, also herein incorporated by reference.

The tetravalent aromatic diamines of Formula II are also well known in the art, and include a variety of aromatic tetraamines (X=NR⁴), bis(hydroxyanilines)(X=O), and bis(mercaptoanilines)(X=S). In Formula II, the tetravalent aromatic nucleus is preferably selected from the group

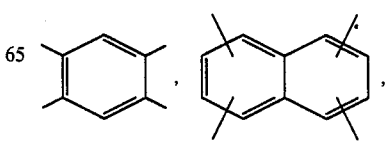

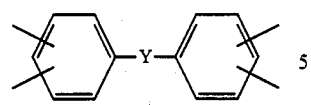

wherein Y represents a single bond or —O—, —S—, —SO$_2$—,

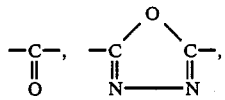

lower alkylene of 1 to 8 carbons, or

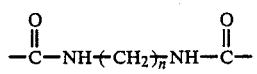

where n is 2 to 8. Representative aromatic tetraamines include 1,2,4,5-tetraaminobenzene; 1,2,5,6-tetraaminonaphthalene; 2,3,6,7-tetraaminonaphthalene; 3,3',4,4'-tetraaminodiphenylmethane; 3,3',4,4'-tetraaminodiphenyl ether; 3,3',4,4'-tetraaminobiphenyl; 3,3',4,4'-tetraamino-1,2-diphenylethane; 2,2-bis(3',4'-diaminophenyl)propane; 3,3',4,4'-tetraaminodiphenyl sulfide; 3,3',4,4'-tetraaminodiphenyl sulfone; 4,4'-bis(N-methylamino)-3,3'-diaminodiphenyl sulfone; and 3,3',4,4'-tetraaminobenzophenone. Examples of bis(hydroxyanilines) include 1,5-diamino-2,4-dihydroxybenzene; 1,4-diamino-2,5-dihydroxybenzene; 4,4'-diamino-3,3'-dihydroxybiphenyl; 3,3'-diamino-4,4'-dihydroxybiphenyl; 2,2-bis(3'-amino-4'-hydroxyphenyl)propane; and 3,3'-diamino-4,4'-dihydroxydiphenyl sulfone. Examples of bis(mercaptoanilines) include 1,5-diamino-2,4-dimercaptobenzene; 1,4-diamino-2,5-dimercaptobenzene; 4,4'-diamino-3,3'-dimercaptobiphenyl; and 3,3'-diamino-4,4'-dimercaptodiphenyl sulfone. Procedures for the synthesis of many of these monomers, along with representative experimental examples, are discussed, for example, in J. K. Stille, et al., "Tetrafunctional Intermediates" in High Polymers, Vol. 27, J. K. Stille and T. W. Campbell, editors, Wiley-Interscience, New York, NY, 1972, pp. 689–733, herein incorporated by reference.

The trivalent aromatic amines of Formulae III and IV which are useful for the purposes of the invention are also well known in the art, and many are available commercially. Examples include 1,2,4-triaminobenzene; 2,4-diaminophenol; 2,4-dihydoxyaniline; 2,4-diaminothiophenol; 2-amino-4-hydroxythiophenol; 4-amino-3-hydroxybenzylamine; 3-amino-4-mercaptophenethylamine; 4-amino-3-hydroxybenzoic acid; 3-amino-4-hydroxybenzoic acid; 3,4-diaminobenzoic acid; 4-amino-3-hydroxyphenylpropionic acid; 3-amino-4-hydroxyphenylpropionic acid; 4-amino-3-hydroxycinnamic acid; 3-amino-4-hydroxycinnamic acid; and 4-amino-3-mercaptobenzoic acid.

It is also considered to be within the scope of the present invention to utilize organic or inorganic acid salts of the aromatic amine monomers II, III, and IV, such as, for example, the hydrochloride salts.

Whereas azlactones undergo straightforward ring-opening reactions with aliphatic and aromatic amines, we have now discovered that azlactones and aromatic amines containing nucleophilic groups in the ortho position react according to two competitive pathways. These pathways are illustrated below:

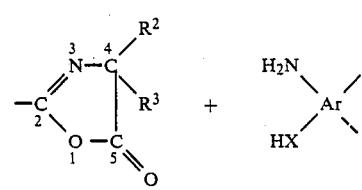

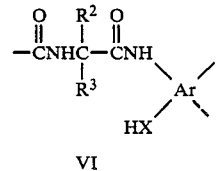
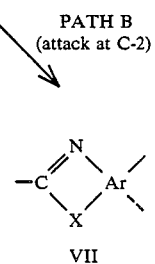

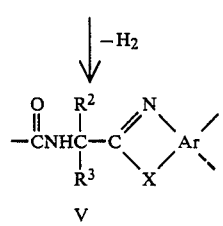
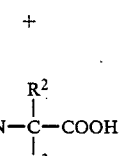

In Path A, nucleophilic addition of the amine to the azlactone carbonyl (C-5 position) results in a ring-opening reaction, generating diamide unit VI. Cyclization of VI with loss of water produces amide-benzazole unit V. Somewhat surprisingly, reaction has also been found to occur according to Path B, presumably via nucleophilic attack of the amine at the 2-position on the azlactone ring. Although the exact nature of the intermediate or intermediates in this reaction is unclear, benzazole unit VII is formed with concomittant production of an aminoacid byproduct.

In any particular polymer-forming reaction, the relative importance of the two pathways in determining the final polymer structure is influenced by a number of variables. Substituents on the bisazlactone I play a major role in determining the course of the reaction. Arylene linking groups (i.e., $R^1$=arylene) tend to promote predominant to exclusive reaction according to Path A, regardless of the nature of the substituent X in the aromatic amine. However, when $R^1$ is alkylene, the nature of X is quite important, with the amount of Path B reaction showing the following order: NH>S>O. As might be anticipated, steric effects may also influence the course of reaction. For example, increasing steric hindrance in the $R^1$ substituent tends to favor Path A, whereas increasing steric hindrance in $R^2$ and $R^3$ in 4,4-disubstituted azlactones, favors Path B. Other factors, such as solvent or reaction temperature may also influence the ratio of Path A/Path B reactions, although to a lesser extent than those variables discussed above.

The reaction to prepare the novel polymers of the invention is generally conducted at elevated temperatures, in the range of 50°–400° C. Although optional, it is usually most convenient to employ an organic solvent as a diluent for the reaction. Suitable organic solvents are all those which contain only non-nucleophilic groups, including: (a) acidic solvents such as acetic acid, trifluoroacetic acid, propionic acid, and o-, m-, and p-cresol, and (b) dipolar aprotic solvents such as dimethylformamide, dimethylacetamide, N-methylpyrrolidone, N-cyclohexylpyrrolidone, dimethyl sulfoxide, sulfolane, and diphenyl sulfone. In addition, mixtures of two or more solvents may be utilized within the scope of the invention. The polymer may or may not remain soluble in the organic solvent as it is formed. Upon completion of the reaction, generally from about 1 to about 48 hours reaction time, isolation of the polymer can be accomplished in a number of ways, including filtration (when the polymer is insoluble), evaporation of the solvent (preferably under vacuum), or precipitation into a nonsolvent.

As illustrated above, the reaction to produce polymers of the invention comprising amidomethylbenzazole units V is envisioned as proceeding in two stages. In the first step, reaction to form a polyamide comprising units of Formula VI occurs. This reaction in general takes place under milder conditions, i.e. lower temperature and/or shorter reaction times, than does the subsequent cyclization step which produces polymers comprising units V. Reaction according to Path B, when it occurs, has also been found to proceed under relatively mild conditions, such as at room temperature in some instances, for example.

As should be obvious to one of skill in the art, the degree of cyclization of amide units VI to benzazole units V will depend upon a number of variables, including: (a) the nature of the substituents on the starting azlactones and aromatic amines; (b) the nature of the ortho substituent XH; (c) the reaction time; (d) the reaction temperature; (e) the presence or absence of solvent; and (f) the nature of the solvent or solvent mixture. Accordingly, it is contemplated as being within the scope of the present invention to prepare polymers having degrees of cyclization which vary from low, i.e. 1-5%, to high, i.e. 80-100%. Indeed, completely noncyclic polyamides which may be produced and isolated by conducting step 1 at moderate temperatures, in the range of about 25°-100° C., are considered to be novel as well. The extent of cyclization is readily determined by examination of the $^1$H— and $^{13}$C—NMR spectra of the polymers. In addition, NMR can be utilized to estimate the relative amounts of reaction according to Path A and Path B discussed above.

The two steps of the process for production of the amide-benzazole polymers of the invention may be carried out in one operation, that is, in one reaction vessel without isolation of the intermediate polyamide VI. In other instances, however, it may be advantageous to isolate this polyamide and then treat it in a subsequent operation to cause cyclization to the benzazole form V. When such a procedure is utilized, it is contemplated that reaction conditions such as temperature or solvent may be different for the two steps.

When aromatic diamines of Formula II are employed in the present invention, it should be realized that the two pairs of NH$_2$ and XH substituents will react essentially independently of one another. For example, one pair may react with an azlactone according to Path A while the other pair may react according to Path B. Alternatively, even though both pairs may react according to Path A, only one of the two may undergo a subsequent cyclodehydration to form the amidomethylbenzazole unit V.

When aromatic amine monomers of general Formulae III and IV are utilized for the preparation of the instant poly(amide-benzazoles), it should be appreciated that additional types of linkages will be formed within the polymer backbone. With amines of Formula III, for example, reaction with an azlactone can produce linkages of general Formula VIII

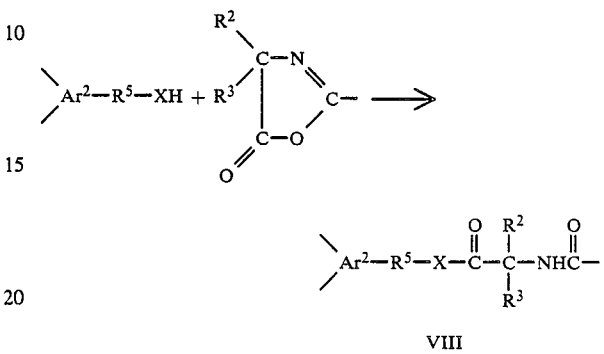

VIII wherein Ar$^2$, R$^5$, X, R$^2$, and R$^3$ are as defined above. With the optional aminoacids of Formula IV, linkages of Formula IX will be formed:

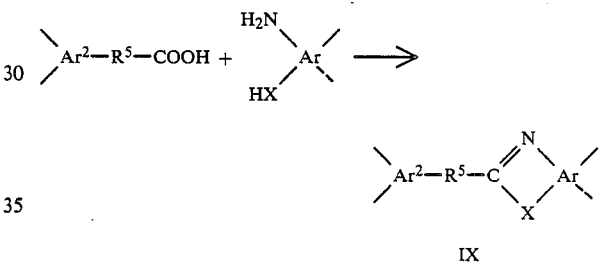

IX wherein Ar$^2$, Ar, R$^5$, and X are as defined above.

The poly(amide-benzazoles) of the present invention can be useful in a variety of applications requiring thermal stability, such as films, adhesives, fibers, or laminates. The increased organic-solvent solubilities of the instant polymers, as compared to the polybenzazoles of the prior art, will allow greater ease in processing.

Objects and advantages of this invention are further illustrated by the following examples, but the particular materials and amounts thereof recited in these examples, as well as other conditions and details, should not be construed to unduly limit this invention. In all cases reactions were conducted under an inert atmosphere of argon or nitrogen.

EXAMPLE 1

3,3',4,4'-Tetraaminodiphenylmethane (14 mMol), p-phenylenebis-(4,4-dimethylazlactone) (bisazlactone A, 14 mMol), and sodium acetate (14 mMol) in glacial acetic acid (20 mL) were refluxed for 24 hr. The mixture was cooled to room temperature and precipitated with acetone. The precipitated polymer was filtered, washed with ethanol, and dried in vacuo to yield 6.9 g of poly(amide-benzimidazole), inherent viscosity 0.18 dL/g (0.5 g/dL in DMF, 30° C.), 40% cyclic by NMR.

EXAMPLE 2

A poly(amide-benzimidazole) was prepared from equimolar amounts of bisazlactone A and 3,3',4,4'-tetraaminobiphenyl under conditions similar to those of Example 1, except that reaction time was 6 hr: inherent visocity=0.10 dL/g (DMF), 30% cyclic by NMR.

EXAMPLE 3

A poly(amide-benzimidazole) was prepared from the monomers utilized in Example 2 by heating at 145° C. in dimethylformamide (DMF) for 24 hr: inherent viscosity=0.11 dL/g, 65% cyclic by NMR.

EXAMPLE 4

A poly(amide-benzimidazole) was prepared according to the procedure of Example 2 from p-phenylenebis(2-oxazolin-5-one) (bisazlactone B) and 3,3',4,4'-tetraaminobiphenyl: inherent viscosity=0.12 dL/g (DMSO), 60% cyclic by NMR.

EXAMPLES 5-11

Further poly(amide-benzimidazoles) were prepared according to the procedure of Example 1 by refluxing for 10-24 hr. Results are listed in Table I.

TABLE I

Poly(amide-benzimidazoles) from bisazlactones and aromatic tetraamines, $$H_2N\text{-}\underset{H_2N}{\diagup}\text{-Ar-Y-Ar-}\underset{NH_2}{\diagdown}\text{-}NH_2$$

| Example | Bisazlactone | Y | Time(hr) | I.V.[a] | % Cyclic |
|---------|--------------|---|----------|---------|----------|
| 5 | A | $-\overset{O}{\underset{\|}{C}}NH\text{-}(CH_2)_6\text{-}NH\overset{O}{\underset{\|}{C}}-$ | 10 | 0.14 | 18 |
| 6 | A | $-\overset{O}{\underset{\|}{C}}NH\text{-}(CH_2)_6\text{-}NH\overset{O}{\underset{\|}{C}}-$ | 24 | 0.21 | 21 |
| 7 | B | $-\overset{O}{\underset{\|}{C}}NH\text{-}(CH_2)_6\text{-}NH\overset{O}{\underset{\|}{C}}-$ | 10 | 0.17 | 73 |
| 8 | A | oxadiazole ring | 24 | 0.25 | 40 |
| 9 | A | —O— | 24 | 0.18 | 5 |
| 10 | A | —SO$_2$— | 10 | 0.19 | 13 |
| 11 | A | —SO$_2$— | 24 | 0.36 | 15 |

[a]Inherent viscosity in DMF (dL/g)

EXAMPLE 12

Bisazlactone A (3.00 g, 10 mMol) and 2,4-diaminophenol dihydrochloride (1,97 g, 10 mMol) were suspended in trifluoroacetic acid (25 mL) in an oven-dried flask fitted with a reflux condensor and drying tube. The mixture was heated at reflux for 36 hr., filtered, and the filtrate diluted with water (200 mL) to precipitate the polymer. The polymer was filtered, washed with water, then dried overnight at 65° C. NMR analysis indicated 86% cyclization to the poly(amide-benzoxazole).

EXAMPLE 13

Bisazlactone A (1.84 g, 6.1 mMol) and 2,4-diamino-1,4-dimercaptobenzene dihydrochloride (1.50 g, 6.1 mMol) were added to deaerated trifluoroacetic acid (25 mL) and the mixture stirred under a nitrogen atmosphere for 16 hr, then refluxed for an additional 16 hr. The mixture was cooled to room temperature and added to water (300 mL). The preciptiated polymer was collected by filtration, washed with saturated aqueous sodium bicarbonate solution and water, and dried to afford 2.78 g. NMR verified the poly(amide-benzothiazole) structure, 100% cyclic.

EXAMPLE 14

Another poly(amide-benzothiazole) was prepared by the procedure of Example 13 except that m-phenylenebis(4,4-dimethylazlactone) (bisazlactone C) was utilized: 80% cyclic by NMR.

EXAMPLE 15

Tetramethylenebis(4,4-dimethylazlactone) and 3,3',4,4'-tetraaminobiphenyl were allowed to react under the conditions utilized in Example 2. NMR spectral analysis of the benzimidazole polymer indicated ca. 90% reaction had occurred according to Path B and ca. 10% via Path A, with ca. 50% of the Path A product being cyclic. Inherent viscosity=0.12 dL/g.

EXAMPLE 16

Solutions (DMF) of the polymers of Examples 2-4 were coated onto glass plates by a doctor blade technique. To insure complete removal of solvent, the coatings were heated overnight at 100° C. The resultant polymer films coated the supports nicely.

EXAMPLES 17-19

Additional poly(amide-benzimidazoles) were prepared from the reaction of bisazlactone C and various tetraamines by refluxing in DMF solution for 24 hours, followed by precipitation into diethylether:

Ex 17: From 3,3',4,4'-tetraaminodiphenyl sulfone; inherent viscosity=0.13 dL/g.

Ex 18: From 3,3',4,4'-tetraaminodiphenylmethane; inherent viscosity=0.13 dL/g, 70% cyclic by NMR.

Ex 19: From 3,3',4,4'-tetraaminobiphenyl; inherent viscosity=0.13 dL/g, 20% cyclic by NMR

EXAMPLE 20

Example 19 was repeated except that chlorobenzene was utilized as a solvent; inherent viscosity=0.10 dL/g, 37% cyclic by NMR.

EXAMPLE 21

Example 1 was repeated except that DMF was utilized as solvent and the polymer was precipitated into diethyl ether: inherent viscosity=0.13 dL/g, 70% cyclic by NMR.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymer comprising 2-amidomethylbenzazole units,

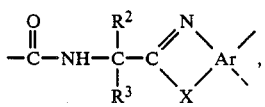  V in the polymer backbone wherein
- Ar is a tetravalent or trivalent aromatic nucleus selected from the group consisting of $Ar^1$ or $Ar^2$, wherein
- $Ar^1$ is a tetravalent aromatic nucleus having two pairs of valences, the members of each pair being situated on adjacent carbon atoms;
- $Ar^2$ is a trivalent aromatic nucleus in which at least two of the valences are situated on adjacent carbon atoms;
- X is $-NR^4-$, $-O-$, or $-S-$, where $R^4$ is hydrogen or alkyl of 1 to 8 carbon atoms or an aryl group;
- $R^2$ and $R^3$ are the same or different and are independently selected from a hydrogen atom, an alkyl group of 1 to 16 carbon atoms, an aryl group of 5 to 12 ring atoms, or an arenyl group of 6 to 26 carbon and S, N, and nonperoxidic O heteroatoms wherein arenyl is a monovalent hydrocarbon containing both alkyl and aryl groups, or $R^2$ and $R^3$ taken together with the carbon atom to which they are joined form a carbocyclic ring of 4 to 12 ring atoms.

2. The polymer according to claim 1 further comprising at least one unit having the formula

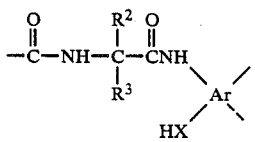  VI in the polymer backbone, wherein Ar, X, $R^2$, and $R^3$ are as defined in claim 1.

3. The polymer according to claim 1 further comprising at least one unit having the formula

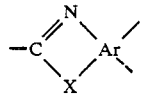  VII which is different from the unit of formula V, wherein Ar and X are as defined in claim 1.

4. The polymer according to claim 1 further comprising at least one unit having the formula

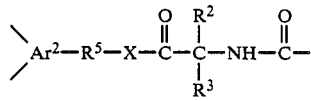  VIII wherein
$Ar^2$, X, $R^2$, and $R^3$ are as defined in claim 1 and
$R^5$ is a single bond or $R^5$ represents an alkylene or alkenylene group of 1 to 4 carbon atoms.

5. The polymer according to claim 1 further comprising at least one unit having the formula

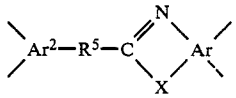  IX wherein $Ar^2$, $R^5$, Ar, and X are as previously defined.

6. The polymer according to claim 1 further comprising at least one unit selected from the group consisting of

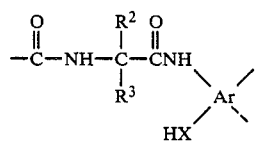  VI

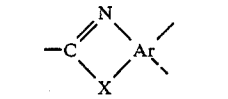  VII

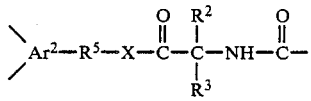  VIII

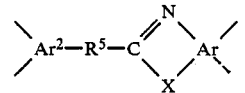  IX wherein Ar, $Ar^2$, X, $R^2$, $R^3$, and $R^5$ are as previously defined.

7. A polymer comprising 2-amidomethylbenzazole units having the formula

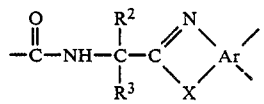  V in the polymer backbone, wherein in formula V
$R^2$ and $R^3$ are the same or different and are independently selected from a hydrogen atom, an alkyl group of 1 to 16 carbon atoms, an aryl group of 5 to 12 ring atoms, or an arenyl group of 6 to 26 carbon and S, N, and nonperoxidic O heteroatoms wherein arenyl is a monovalent hydrocarbon containing both alkyl and aryl groups, or $R^2$ and $R^3$ taken together with the carbon atom to which they are joined form a carbocyclic ring of 4 to 12 ring atoms;

Ar is a tetravalent or trivalent aromatic group selected from the group consisting of $Ar^1$ and $Ar^2$, wherein $Ar^1$ is a tetravalent aromatic nucleus having two pairs of valences, the members of each pair being situated on adjacent carbon atoms; and $Ar^2$ is a trivalent aromatic nucleus in which at least two of the valences are situated on adjacent carbon atoms; and X is $-NR^4-$, $-O-$, or $-S-$, where $R^4$ is hydrogen or alkyl of 1 to 8 carbon atoms or an aryl group;

said polymer being the reaction product of a bisazlactone with an aromatic amine monomer having at least one additional nucleophilic group ortho to the amine substituent, followed by cyclodehydration.

8. The polymer according to claim 7 wherein said bisazlactone of said reaction has the formula

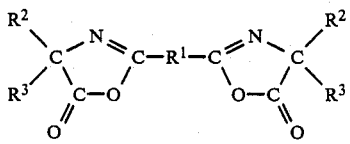  I wherein
$R^2$ and $R^3$ are as defined in claim 6 and
$R^1$ is a single bond or $R^1$ represents a hydrocarbon group selected from alkylene groups of 1 to 16 carbon atoms, alkenylene groups of 2 to 16 carbon atoms, arylene groups of 5 to 12 ring atoms, and arenylene groups of 6 to 26 carbon and S, N, and nonperoxidic O heteroatoms.

9. The polymer according to claim 7 wherein in said reaction said aromatic amine monomer has the formula

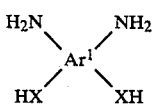  II wherein $Ar^1$ and each X is the same or different and are indpendently defined as in claim 7.

10. The polymer according to claim 7 wherein said reaction further comprises an aromatic aminoacid having the formula

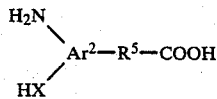  IV to provide additional units of the formula

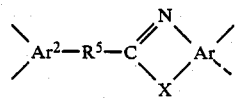  IX wherein $Ar^2$ and X are as previously defined, and $R^5$ is a single bond or an alkylene or alkenylene group of 1 to 4 carbon atoms.

11. The polymer according to claim 7 wherein said reaction further comprises an aromatic amine of the formula

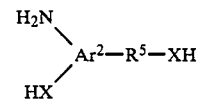  III to provide additional units of the formula

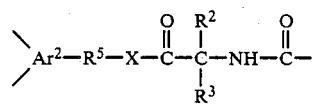  VIII wherein $Ar^2$, X, $R^2$, $R^3$ and $R^5$ are as previously defined.

12. A polymer comprising in its backbone units selected from the group consisting of

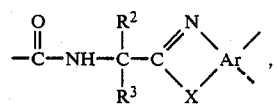  V

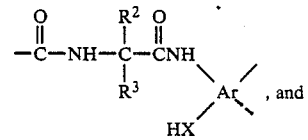  VI and

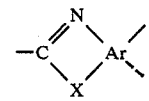  VII wherein the unit of structure VII is different from the unit of structure V, and wherein Ar is a tetravalent or trivalent aromatic group selected from the group consisting of $Ar^1$ or $Ar^2$, wherein $Ar^1$ is a tetravalent aromatic nucleus having two pairs of valences, the members of each pair being situated on adjacent carbon atoms; and $Ar^2$ is a trivalent aromatic nucleus in which at least two of the valences are situated on adjacent carbon atoms;

X is $-NR^4-$, $-O-$, or $-S-$, where $R^4$ is hydrogen or alkyl of 1 to 8 carbon atoms or an aryl group;

$R^2$ and $R^3$ are the same or different and are independently selected from a hydrogen atom, an alkyl group of 1 to 16 carbon atoms, an aryl group of 5 to 12 ring atoms, or an arenyl group of 6 to 26 carbon and S, N, and nonperoxidic O heteroatoms wherein arenyl is a monovalent hydrocarbon containing both alkyl and aryl groups, or $R^2$ and $R^3$ taken together with the carbon atom to which they are joined form a carbocyclic ring of 4 to 12 ring atoms.

13. The polymer according to claim 12 further comprising at least one unit of the formula

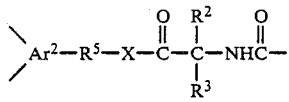

VIII wherein Ar², X, R², R³, and R⁵ are as previously defined.

14. The polymer according to claim 12 further comprising at least one unit of the formula

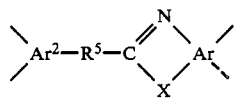

IX wherein Ar² and X are as previously defined, and R⁵ is a single bond or an alkylene or alkenylene group of 1 to 4 carbon atoms.

15. A process comprising the steps of
(a) reacting a bisazlactone having the formula

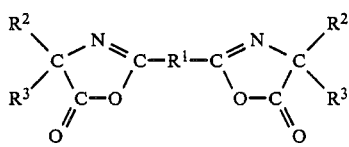

I with an aromatic amine monomer having at least one additional nucleophilic group ortho to the amine substituent to provide a ring-opened aromatic diamide having at least one unit of the formula

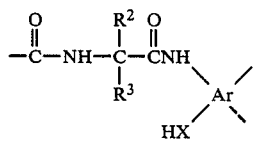

VI and
(b) cyclodehydrating said ring-opened aromatic diamide to provide a polymer having at least one 2-amidomethylbenzazole unit of the formula

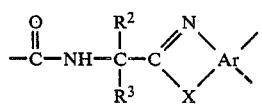

V wherein in Formulae I, V and VI,
R¹ is a single bond or R¹ represents a hydrocarbon group selected from alkylene groups of 1 to 16 carbon atoms, alkenylene groups of 2 to 16 carbon atoms, arylene groups of 5 to 12 ring atoms, and arenylene groups of 6 to 26 carbon and S, N, and nonperoxidic O heteroatoms,
R² and R³ are the same or different and are independently selected from a hydrogen atom, an alkyl group of 1 to 16 carbon atoms, an aryl group of 5 to 12 carbon atoms, or an arenyl group of 6 to 26 carbon and S, N, and nonperoxidic O heteroatoms, wherein arenyl is a monovalent hydrocarbon containing both alkyl and aryl groups, or R² and R³ taken together with the carbon atom to which they are joined form a carbocyclic ring of 4 to 12 ring atoms, and Ar is a tetravalent or trivalent aromatic group selected from the group consisting of Ar¹ and Ar², wherein Ar¹ is a tetravalent aromatic nucleus having two pairs of valences, the members of each pair being situated on adjacent carbon atoms; and Ar² is a trivalent aromatic nucleus in which at least two of the valences are situated on adjacent carbon atoms; and X is —NR⁴—, —O—, or —S—, where R⁴ is hydrogen or alkyl of 1 to 8 carbon atoms or an aryl group.

16. The process according to claim 15 wherein said aromatic amine monomer is a tetravalent aromatic diamine having the formula

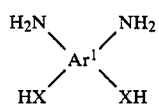

II wherein Ar¹ and each X is as previously defined.

17. The process according to claim 15 wherein said aromatic amine monomer comprises a trivalent aromatic amine having the formula

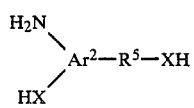

III to provide polymer units having the formula

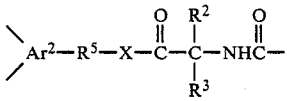

VIII wherein in formula III and VIII Ar², R², R³, R⁵, and X are as previously defined.

18. The process according to claim 16 wherein said aromatic amine monomer further comprises a trivalent aromatic aminoacid having the formula

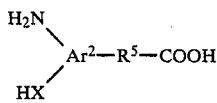

IV to provide additional polymer units of the formula

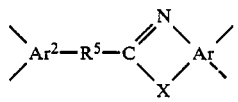

wherein Ar, Ar², R⁵, and X are as previously defined.

19. The process according to claim 15 further comprising an organic solvent which contains only non-nucleophilic groups.

* * * * *

UNITED STATES PATENT AND TRADEMARK OFFICE
CERTIFICATE OF CORRECTION

PATENT NO. : 4,816,554

DATED : March 28, 1989

INVENTOR(S) : Alan R. Katritzky et al.

It is certified that error appears in the above-identified patent and that said Letters Patent is hereby corrected as shown below:

On the cover page, under item [19] and in item [75], "Katritzksy" should be -- Katritzky --.

Col. 2, line 67, "'arenyl'" should be the start of a new paragraph.

Col. 6, line 23, delete "$-H_2$" and insert therefor -- $-H_2O$ --.

Signed and Sealed this

Seventeenth Day of September, 1991

*Attest:*

HARRY F. MANBECK, JR.

*Attesting Officer*     *Commissioner of Patents and Trademarks*